United States Patent [19]

Schnabel et al.

[11] 4,436,286
[45] Mar. 13, 1984

[54] PROCESS OF AFTERBURNING COMBUSTIBLE CONSTITUENTS OF EXHAUST GASES FROM ROTARY KILNS

[75] Inventors: Wolfram Schnabel, Idstein; Ernst Scheu, Frankfurt am Main; Harry Serbent, Hanau, all of Fed. Rep. of Germany

[73] Assignee: Metallgesellschaft Aktiengesellschaft, Frankfurt am Main, Fed. Rep. of Germany

[21] Appl. No.: 417,956

[22] Filed: Sep. 14, 1982

[30] Foreign Application Priority Data

Mar. 12, 1982 [DE] Fed. Rep. of Germany ....... 3208987

[51] Int. Cl.³ .............................................. C21B 13/08
[52] U.S. Cl. ..................................... 266/44; 75/1 R; 75/36; 266/145; 432/72
[58] Field of Search .......................... 266/44, 145, 173; 432/72; 75/36, 1 R

[56] References Cited

U.S. PATENT DOCUMENTS 3,705,711 12/1972 Seelandt et al. ..................... 432/72

*Primary Examiner*—M. J. Andrews
*Attorney, Agent, or Firm*—Sprung, Horn, Kramer & Woods

[57] ABSTRACT

In order to avoid incrustation and an excessively strong thermal attack on the afterburning chamber, the exhaust gases which contain gaseous and solid constituents which are combustible are afterburned in a plurality of stages, which are connected in series. The rate at which oxygen is supplied to each stage is so controlled that part of the combustible constituents is afterburned in each stage. The gas which is about to enter each succeeding stage is cooled by injected water.

7 Claims, 1 Drawing Figure

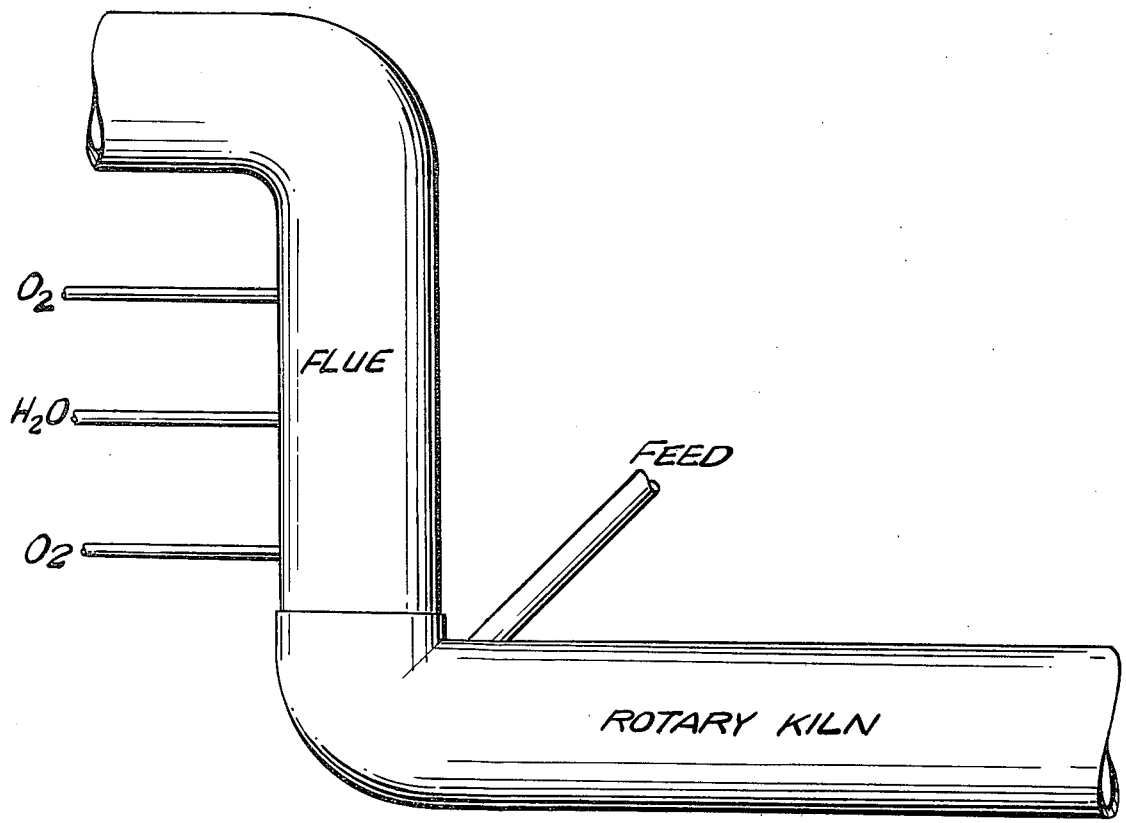

PROCESS OF AFTERBURNING COMBUSTIBLE CONSTITUENTS OF EXHAUST GASES FROM ROTARY KILNS

BACKGROUND OF THE INVENTION

1. Field of the Invention

This invention relates to a process of afterburning combustible constituents of exhaust gases from rotary kilns used for metallurgical processes, wherein the exhaust gases from the rotary kiln are afterburnt in an afterburning chamber supplied with oxygen-containing gases.

2. Discussion of Prior Art

When metallurgical processes such as the magnetizing roasting of iron ore, the burning of limestone and particularly the production of sponge iron by a direct reduction of iron ores or the waeltz process, are carried out in a rotary kiln, the exhaust gases from the rotary kiln still contain combustible constituents, which cannot be burned in the rotary kiln. Depending on the process employed, the combustible constituents consist mainly of CO, $H_2$, hydrocarbons, solid carbon that has been entrained by the gas or oxidizable products of the process, such as zinc or or lead vapor. The contents of combustible constituents are relatively high if the rotary kiln is charged with coals which have a high content of volatile constituents. The exhaust gases also contain incombustible fine dusts. In order to avoid a pollution of the environment and to utilize the latent heat content of the exhaust gases, their combustible constituents must be afterburnt and the dusts must be removed from the exhaust gas.

It is known from U.S. Pat. No. 2,112,566 to completely afterburn the entire exhaust gas from a rotary kiln or part of said exhaust gas by an addition of air in one stage and to pass the afterburnt gas through a bed of solids carried by a traveling grate. By the complete afterburning in a single stage, the gas is heated to such a high temperature that the lining of the afterburner chamber is subjected to a strong thermal attack and the melting or softening point of the fine dust is reached to the extent that incrustation results.

It is known from German No. 20 01 563 to provide an exhaust gas duct which has a cooled pipe wall and directly succeeds the gas outlet end of a rotary kiln and opens into the radiant heating space of a waste heat boiler. Shortly before the radiant heating space, oxygen-containing gases are supplied to effect a complete afterburning. Part of the gas which has been completely afterburnt is cooled in the waste heat boiler below the caking temperature of its solid contents and is then withdrawn from the waste boiler and used to heat the charge on a traveling grate. Whereas incrustation can be avoided to a high degree by this practice, a closely succeeding waste heat boiler is always required which involves a considerable expenditure. Additionally, care must be taken to maintain a laminar flow in the radiant heating space in order to prevent an incrustation by softened solids reaching the wall.

SUMMARY OF THE INVENTION

It is an object of the invention to provide a complete afterburning of the exhaust gases in a technically and commercially simple and reliable manner without a strong thermal attack on the walls of the afterburning chamber and without incrustation.

This object is accomplished, according to the invention, in that part of the combustible constituents is burned in each of a plurality of series-connected stages, each of which is suppled with oxygen at a controlled rate and the gas which is about to enter each succeeding stage is cooled by injected water.

Afterburning is effected in at least two stages. If the temperature of the exhaust gas leaving the rotary kiln is close to or at the caking temperature of the entrained fine dust, the gas which is about to enter the first afterburning stage is cooled by injected water. If the temperature of the exhaust gas is below the caking temperature, no cooling is required before the first stage. The caking temperature depends on the composition of the entrained solids. Oxygen is blown into the first afterburning stage only at such a rate that the heat produced by afterburning does not increase the gas temperature above the caking temperature.

After the first stage, the gas is cooled by injected water. The gas is treated analogously in the second stage and any further stage. No cooling is required after the last stage. The several stages in the afterburning chamber are not separated by partitions. The afterburning chamber is generally defined by an upright tower, to which supply conduits for the oxygen-containing gas and the water are connected on certain superimposed levels. At critical points where the gases are deflected, cooling surfaces may be incorporated in order to prevent incrustation and to permit a higher heat recovery.

The afterburning chamber may also be used as a radiant heating space of a waste heat boiler. The heat content of the afterburnt exhaust gases may be used to preheat feedstock or to produce hot water or steam or electric power.

According to a preferred further feature, the oxygen-containing gases enter the afterburning chamber with a swirl and for this purpose are tangentially blown into said chamber. This results in a thorough mixing and in a controlled afterburning in each stage.

According to a further preferred feature, the velocity of the oxygen-containing gases leaving the nozzles is controlled by a variation of the exit cross-section of the nozzles. This ensures a stable combustion even when the gas rates vary because a thorough mixing will always be effected.

According to a further preferred feature, the oxygen-containing gases are fed into successive afterburning stages with swirls in mutually opposite senses. This will result in a very effective mixing and afterburning of the gases in each stage.

According to a further preferred feature, the exhaust gases which are about to enter an afterburning stage are cooled to a temperature which is slightly above the ignition temperature of the gases in said stage. The gases are generally adjusted to a temperature of 40° C. to 150° C., especially 50° C. above the ignition temperature. This permits complete afterburning under favorable operating conditions in a few stages. However, the gas which is about to enter a stage should not be cooled below its ignition temperature.

According to a further preferred feature, the oxygen-containing gas supplied to the afterburner plant comprises dust-entraining air from locations where coal is unloaded and/or the locations where coal is transferred and/or from a crusher for coal. Removal of dust from such coal environments is normally required for ecological purposes. This removal of dust from such coal environment is effected by sucking air from said locations.

The coal-containing air must subsequently be purified. Purification is normally effected in tubular filters or in a gas-purifying electrostatic precipitator. This involves additional costs and involves a risk of coal dust explosions because the dust-entraining air has been sucked off may contain coal dust in a high concentration for short times. Such purification of coal dust entrained air can be avoided if the dust-entraining air is supplied to the afterburning chamber.

The advantages afforded by the invention reside in that the gaseous and solid combustible constituents of the exhaust gas can be completely afterburned in a technically satisfactory manner and without incrustation or damge to the lining. A complete afterburning can be effected without need for a high excess of oxygen. The heat content of the exhaust gases can be utilized to a high degree.

BRIEF DESCRIPTION OF DRAWINGS

The annexed drawing shows schematically a cross-section of an afterburner disposed at the feed end of a rotary kiln.

EXAMPLE

The afterburning chamber had a height of 6.4 meters and an inner diameter of 3.5 meters.

The waste gas from a rotary kiln, in which a direct reduction of iron ores to sponge iron was performed, had a temperature of 1050° C. and the following composition:

58.4% by volume $N_2$
18.0% by volume $CO_2$
6.5% by volume $CO$
11.5% by volume $H_2O$
5.0% by volume $H_2$
0.6% by volume $O_2$
30 g/$Nm^3$ dust, containing
10 g/$Nm^3$ carbon The waste gas was cooled to a mean temperature of 950° C. by injection of water and then supplied into the first stage of the afterburning chamber.

In the first stage 40% of the combustible constituents of the waste gas were combusted by supplying air at controlled rate. Between the first and second stage water was injected at a rate that the mean temperature of the gas was 1000° C. In the second stage the remainder of the combustible constituents were combusted by supplying air at controlled rate. The exit temerature of the gas was 1100° C. The composition was:

54.8% by volume $N_2$
14.9% by volume $CO_2$
29.0% by volume $H_2O$
1.3% by volume $O_2$ The gas was cooled by injection of water to a mean temperature of 1000° C.±50° C. corresponding to the softening behavior of the dust before entrance into the outlet gas duct.

What is claimed is:

1. In a process of afterburning combustible constituents of exhaust gases from rotary kilns used for metallurgical processes, comprising afterburning the exhaust gases from the rotary kiln at a temperature above their ignition temperature in an afterburning chamber and supplying oxygen-containing gases to said afterburning chamber, the improvement comprising burning part of the combustible constituents in each of a plurality of series connected stages in said afterburner, supplying each of such stages with oxygen at a controlled rate, and cooling the gas which is about to enter each succeeding stage by injecting water to a temperature above the ignition temperature of the gas and below the caking temperature of the entrained fine dust.

2. A process according to claim 1, further comprising introducing oxygen-containing gas into the first stage in an amount such that the heat produced by afterburning does not increase the gas temperature above the caking temperature of the entrained fine dust.

3. A process according to claim 1, further comprising introducing the oxygen-containing gases enter the afterburning chamber with a swirl.

4. A process according to claim 1, further comprising controlling the velocity of the oxygen-containing gases leaving the nozzles by varying the exit cross-section of the nozzle or nozzles through which it is introduced.

5. A process according to claim 3, further comprising feeding the oxygen-containing gases into successive afterburning stages with swirls in mutually opposite senses.

6. A process according to claim 1, further comprising cooling exhaust gas which is about to enter an afterburning stage to a temperature which is slightly above the ignition temperature of the gases in said stage.

7. A process according to claim 1, wherein the oxygen-containing gas supplied to the afterburner plant consists of dust-entraining air from locations where coal is unloaded and/or the locations where coal is transferred and/or from a crusher for coal.

* * * * *